Patented July 16, 1940

2,207,753

UNITED STATES PATENT OFFICE 2,207,753

DI-ALKYL PHENOLS

Clarence L. Moyle, Midland, Mich., and Edward M. Van Duzee, deceased, late of Midland, Mich., by Clarence H. Macomber, administrator, Midland, Mich., assignors to The Dow Chemical Company, Midland, Mich., a corporation of Michigan No Drawing. Application June 10, 1937, Serial No. 147,528

7 Claims. (Cl. 260—624)

This invention relates to the di-alkyl-phenols, and is particularly concerned with those compounds having the following formula

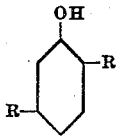

wherein each R represents an alkyl radical containing at least 2 carbon atoms, and the sum of the carbon atoms of the substituting alkyl groups is at least 6.

Representative members of the above-identified group of compounds have been prepared, and certain physical properties thereof determined whereby they may be identified. These compounds may be employed as components of germicidal compositions and are particularly useful as antiseptics because of their innocuous and non-irritating nature. The invention, then, consists in the new compounds and a method for preparing the same hereinafter fully described and particularly pointed out in the claims.

These new compounds can be prepared by the hydrolysis of the 2-halo-1,4-di-alkyl-benzenes. In carrying out this reaction, a mixture consisting of a halo-alkyl-benzene compound, suitable alkaline hydrolyzing agent, water, and a copper catalyst is placed in a pressure reactor and heated to a reaction temperature and under the vapor pressure of the reaction mixture for a period of time varying with the particular halo-alkyl-benzene compound and hydrolyzing agent employed. The reactor is then cooled, and the contents removed therefrom, filtered to remove catalyst, acidified to Congo red with dilute inorganic acid, extracted with a suitable organic solvent, and the extract distilled under reduced pressure to obtain the desired 2,5-di-alkyl-phenol product.

While any suitable amount of hydrolyzing agent may be employed, it is generally preferable to use from about two to about three molecular proportions thereof for each mole of halo-alkyl-benzene, although greater amounts may be employed if desired. The alkaline agent is employed as a water solution varying in concentration between 5 and 10 per cent by weight. The temperature required to produce the desired hydrolysis of the halogenated benzene compound varies between 200° and 300° C. depending upon the halo-di-alkyl-benzene compound employed, the particular alkaline agent and amount thereof in the reaction mixture, the concentration of such hydrolyzing agent, and the catalyst employed. The catalyst recovered by filtration following completion of the hydrolysis step may be re-utilized in subsequent runs.

The following examples describe in detail the preparation of certain specific members of this new class of compounds, but are not to be construed as limiting the same.

Example 1

A mixture consisting of 23.1 grams (0.096 mol) of 2-bromo-1,4-di-isopropyl-benzene, 9.6 grams (0.24 mol) of sodium hydroxide, 182 millimeters of water, and 2 grams of cuprous oxide was charged into a copper-lined rotating high pressure reactor and heated for 3 hours at approximately 250° C., and under the pressure of the reactants at that temperature. At the end of this time titration of an aliquot portion of the reaction mixture indicated a conversion of 96.8 per cent of theoretical. The reactor was then cooled to room temperature and the contents removed therefrom, filtered to remove copper oxide catalyst, acidified with dilute sulphuric acid, and extracted with benzene. The benzene extract was fractionally distilled whereby there was obtained 2,5-di-isopropyl-phenol as a viscous liquid boiling at 115°–120° C. at 5 millimeters pressure, and having the specific gravity 0.952 at 21°/4° C.

Example 2

In a similar manner 1-ethyl-2-chloro-4-secondary-amyl-benzene was hydrolyzed to obtain 2-ethyl-5-secondary-amyl-phenol as a water-white liquid boiling at 132°–133° C. at 10 millimeters pressure, and having the specific gravity 0.952 at 21°/4° C.

Example 3

The hydrolysis of 1-ethyl-2-bromo-4-secondary-hexyl-benzene with aqueous sodium hydroxide in the presence of a catalytic amount of cuprous oxide resulted in the formation of 2-ethyl-5-secondary-hexyl-phenol, which was isolated on fractional distillation as a white, sirupy product boiling between 133° and 142° C. at 13 millimeters pressure, and having a specific gravity of 0.959 at 21°/4° C.

*Example 4*

1-isopropyl-2-bromo-4--secondary-hexyl-benzene was reacted with aqueous sodium hydroxide in the presence of a catalytic amount of cuprous oxide substantially as described in Example 1, whereby there was obtained 2-isopropyl-5-secondary-hexyl-phenol. This compound is a colorless oil boiling at 140°–150° C. at 15 millimeters pressure, and having a refractive index of 1.511 at 23° C. with respect to the D line of sodium.

In a similar manner, other 2-halo-1,4-di-alkyl-benzenes may be hydrolyzed to produce 2,5-di-alkyl-phenols such as 2-tertiary-butyl-5-normal-propyl - phenol, 2,5 - di - secondary - butyl-phenol, 2,5-di-normal-butyl-phenol, 2-ethyl-5-tertiary-octyl-phenol, 2-normal-octyl-5-tertiary-amyl-phenol, etc.

If desired, other alkaline agents such as potassium hydroxide, barium hydroxide, sodium carbonate, etc., may be substituted for the sodium hydroxide shown in the examples. Similarly, finely divided metallic copper, cuprous chloride, cuprous acetate, etc., may be substituted for cuprous oxide.

The above-described new compounds have been found to have high phenol coefficients and to be substantially non-irritating to skin and tissue when contacted therewith. For example, 2,5-di-isopropyl-phenol has a phenol coefficient against *E. typhi* of 27.5–28, and against *Staph. aureus* of 73.5. These values were determined according to the method developed by the United States Public Health Service, Hygienic Laboratory, Circular No. 198 of the Food and Drug Administration, United States Department of Agriculture.

Other modes of applying the principle of the invention may be employed instead of those explained, change being made as regards the method or compounds herein disclosed, provided the steps or compounds stated by any of the following claims or the equivalent of such stated steps or compounds be employed.

We therefore particularly point out and distinctly claim as the invention:

1. A di-alkyl-phenol having the formula

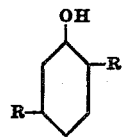

wherein each R represents an alkyl group containing at least 2 carbon atoms, and the sum of the carbon atoms in the two alkyl groups is at least 6.

2. A di-alkyl-phenol having the formula

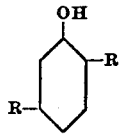

wherein each R represents an alkyl group containing from 2 to 8 carbon atoms, inclusive, and the sum of the carbon atoms in the alkyl groups is at least 6.

3. A di-alkyl-phenol having the formula

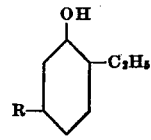

wherein R represents an alkyl group containing at least 4 carbon atoms.

4. A di-alkyl phenol compound having the formula

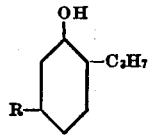

wherein R represents an alkyl group containing at least 3 carbon atoms.

5. 2,5-di-isopropyl-phenol.
6. 2-ethyl-5-secondary-amyl-phenol.
7. 2-ethyl-5-secondary-hexyl-phenol.

CLARENCE H. MACOMBER,
*Administrator of the Estate of Edward M. Van Duzee, Deceased.*

CLARENCE L. MOYLE.